(12) United States Patent
Hurlin (10) Patent No.: US 11,773,779 B2
(45) Date of Patent: Oct. 3, 2023

(54) AIR INLET AND METHOD FOR DE-ICING AN AIR INLET INTO A NACELLE OF AN AIRCRAFT TURBOJET ENGINE

(71) Applicant: SAFRAN NACELLES, Gonfreville-l'Orcher (FR)

(72) Inventor: Hervé Léopold Hurlin, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 17/776,433

(22) PCT Filed: Nov. 20, 2020

(86) PCT No.: PCT/EP2020/082960
§ 371 (c)(1),
(2) Date: May 12, 2022

(87) PCT Pub. No.: WO2021/105022
PCT Pub. Date: Jun. 3, 2021

(65) Prior Publication Data
US 2022/0403778 A1    Dec. 22, 2022

(30) Foreign Application Priority Data
Nov. 27, 2019   (FR) ...................... 1913301

(51) Int. Cl.
*F02C 7/047* (2006.01)
*F02C 7/04* (2006.01)

(52) U.S. Cl.
CPC ............. *F02C 7/047* (2013.01); *F02C 7/04* (2013.01); *F05D 2220/323* (2013.01); *F05D 2260/20* (2013.01)

(58) Field of Classification Search
CPC .. F02C 7/045; F02C 7/047; F02C 7/04; F05D 2220/323; F05D 2260/20; F05D 2260/96; F05D 2260/963
See application file for complete search history.

(56) References Cited

U.S. PATENT DOCUMENTS

| 3,933,327 A | 1/1976 | Cook et al. |
| 5,841,079 A | 11/1998 | Parente |

(Continued)

FOREIGN PATENT DOCUMENTS

WO    WO 2015/071609 A1    5/2015

OTHER PUBLICATIONS

Search Report from the French Intellectual Property Office on corresponding FR application (FR1913301) dated Jul. 16, 2020.

(Continued)

*Primary Examiner* — Steven M Sutherland
(74) *Attorney, Agent, or Firm* — KOS IP LAW LLP (57) ABSTRACT

An air inlet into a nacelle of an aircraft turbojet engine having a de-icing device and extends along an axis X, an air stream flowing in the air inlet from upstream to downstream, the inlet comprising an inner wall and an outer wall which are connected by a leading edge, the inner wall having a plurality of air delivery lines, each air delivery line having a plurality of through-holes designed to blow elementary streams from the hot air source in order to de-ice said inner wall, the air delivery lines being parallel to one another in a cylindrical projection plane, each air delivery line having a depth P3 defined along the axis X as well as a length L3 defined along the axis Y in the cylindrical projection plane, two adjacent air delivery lines being spaced apart by a distance D3, each position along the axis Y with no more than one through-hole, the ratio of the distances L3/D3 being between 0.8 and 1.

11 Claims, 6 Drawing Sheets

(56) References Cited

U.S. PATENT DOCUMENTS

2014/0072405 A1* 3/2014 Belmonte ............... F01D 25/02
 415/116
2016/0024963 A1* 1/2016 Lumbab ................. F01D 25/04
 29/896.2
2017/0298821 A1* 10/2017 Welch ...................... F02C 7/24

OTHER PUBLICATIONS

International Search Report and Written Opinion on corresponding PCT application (PCT/EP2020/082960) from International Searching Authority (EPO) dated Feb. 10, 2021.

* cited by examiner

AIR INLET AND METHOD FOR DE-ICING AN AIR INLET INTO A NACELLE OF AN AIRCRAFT TURBOJET ENGINE

TECHNICAL FIELD

The present invention relates to the field of aircraft turbojet engines and is aimed more particularly at a device for de-icing an air inlet of an aircraft turbojet engine nacelle.

BACKGROUND

In a known manner, an aircraft comprises one or more turbojet engines to allow its propulsion by acceleration of an air flow which circulates from upstream to downstream in the turbojet engine.

Figure 1:
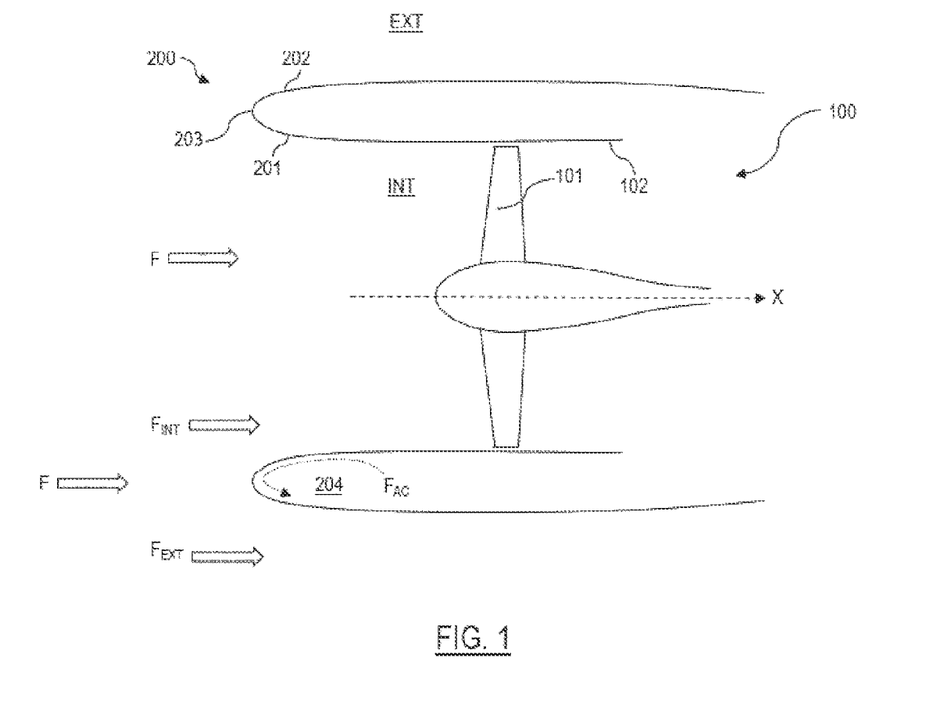
FIG. 1 is a schematic longitudinal cross-sectional representation of an aircraft turbojet engine and an air inlet according to prior art.

With reference to [FIG. 1], there is represented a turbojet engine 100 extending along an axis X and comprising a fan 101 rotatably mounted about the axis X in an outer shroud 102 in order to accelerate an air flow F from upstream to downstream. Hereafter, the terms upstream and downstream are defined in relation to the circulation of the air flow F. At its upstream end the turbojet engine 100 comprises an air inlet 200 comprising an inner wall 201 facing the axis X and an outer wall 202 which is opposite the inner wall 201, the walls 201, 202 are connected by a leading edge 203 also called "air inlet lip". Thus, the air inlet 200 separates the incoming air flow F into an inner air flow FINT guided by the inner wall 201 and an outer air flow FEXT guided by the outer wall 202. Hereinafter, the terms inner and outer are defined radially with respect to the axis X of the turbojet engine 100.

In a known manner, during the flight of an aircraft, due to temperature and pressure conditions, ice is likely to build up at the leading edge 203 and the inner wall 201 of the air inlet 200 and to form blocks of ice that are likely to be ingested by the turbojet engine 100. Such ingestions have to be avoided in order to improve the life of the turbojet engine 100 and to reduce malfunctions.

To eliminate ice build-up, with reference to [FIG .1], it is known to circulate a hot air flow FAC through an inner cavity 204 formed between the inner wall 201 and the outer wall 202 of the air inlet 200. Such a circulation of hot air makes it possible, by thermal conduction, to heat the inner wall 201 and thus avoid the build-up of ice which melts as it builds up. Such a circulation of a hot air flow FAC remains complex given that the air inlet 200 can also fulfill an acoustic function and can generally comprise a honeycomb structure on its inner wall 201. To this end, it has been provided by patent application FR2912781 and patent application WO2015/071609 to provide channels for circulation of a hot air flow in the honeycomb structure. Also known in prior art are patent applications U.S. Pat. Nos. 3,933,327A and 5,841,079A.

Incidentally, a de-icing device is also known that has through openings in the inner and outer wall to eject the hot air flow. Such a technical solution is not used since it consumes a lot of energy because the air is ejected occasionally and only achieves an imperfect de-icing.

It is also known an air inlet inner wall having through openings, evenly distributed on the inner wall, in order to blow a hot air flow radially towards the outside of the inner wall, into the air stream of the engine. In practice, the high number of through openings significantly increases the hot air consumption and penalizes the acoustic treatment. This is particularly problematic for a high bypass ratio turbojet engine with a large diameter air inlet. In addition, the blowing efficiency is not optimal since several through openings are aligned parallel to the axis of the turbojet engine, which lowers the heating efficiency during the circulation of an incident air flow from upstream to downstream facing two through openings aligned parallel to the axis X due to pressure balances. This results in high hot air consumption. One of the objectives of the present invention is to prevent any ice build-up while allowing an efficient and economical acoustic treatment. Another objective is to optimally limit the amount of air required for heating.

In addition, it is another objective to provide an air inlet that has the above advantages while being simple and inexpensive to manufacture.

SUMMARY

To this end, the invention relates to an air inlet of an aircraft turbojet engine nacelle comprising a de-icing device and extending along an axis X in which an air flow circulates from upstream to downstream, the air inlet extending annularly about the axis X and comprising an inner wall facing the axis X and an outer wall which is opposite the inner wall, the walls being connected by a leading edge and a front internal partition so as to delimit an annular cavity, the de-icing device comprising at least one hot air source in the annular cavity.

The invention is remarkable in that the inner wall comprises a plurality of blowing lines, each blowing line comprising a plurality of through openings configured to blow elementary flows from the hot air source in order to de-ice said inner wall, the blowing lines being parallel to each other in a cylindrical projection plane defined with respect to the axis X of the turbojet engine and to an axis Y defining the angular position with respect to the axis X, each blowing line having a depth P3 defined along the axis X and a length L3 defined along the axis Y in the cylindrical projection plane, two adjacent blowing lines being spaced apart by a distance D3 along the axis Y, each position along the axis Y comprising at most one through opening, the ratio of distances L3/D3 is comprised in the interval [0.8; 1[.

Thus, unlike prior art, which provided for the blowing openings to be arranged in a distributed and homogeneous manner on the surface of the inner wall, the invention advantageously provides to organize them in lines by spacing them so as to limit any overlay or overlap. Moreover, the ratio of distances L3/D3 inhibits any overlay, which limits the number of through openings for blowing and limits the number of hot air flow emissions. The propagation of an elementary flow after its blowing through a through opening is taken advantage of to heat the wall located between two adjacent fan lines. In other words, each stream line circulating from upstream to downstream on the inner wall does not come into contact with at least one blowing line but is heated by the elementary flow whose propagation forms a flared cone from upstream to downstream. The number of through openings is significantly reduced. This makes de-icing more economical, which is advantageous for a high bypass ratio turbojet engine with a large diameter air inlet. The advantages of the propagation according to a flared cone are optimally exploited. Advantageously, two through openings are not aligned along the axis X.

Preferably, each blowing line is spaced apart by a tilt angle θ with respect to the axis X in the cylindrical projection plane, the tilt angle being between 20° and 70°. Such a tilt angle allows a compromise between efficiency and economy. The smaller the tilt angle, the greater the number of blowing lines and the more efficient the de-icing.

Preferably, the inner wall comprises at least one free angular zone, formed between two adjacent blowing lines, which has no through openings. Such a free angular zone is advantageously de-iced, by edge effects, by the adjacent blowing lines which propagate elementary flows according to flared cones from upstream to downstream due to the circulation of the stream lines.

Preferably, each blowing line comprises at least one through opening located the most upstream, called "primary opening", configured to blow elementary flows from the hot air source according to a propagation cone whose amplitude is greater than at least one other through opening of the blowing line, preferably that of each other through opening. The primary opening advantageously makes it possible, due to its upstream positioning, to be close to a free angular zone and to optimally de-ice it during the emission of an elementary flow according to a propagation cone of great amplitude. Such a propagation cone makes it possible to cover an important part of the free angular zone.

Preferably, each blowing line has at least 5 through openings, preferably at least 10 through openings, more preferably at least 15. A large number of through openings is optimal for a turbojet engine. In addition, it allows defining a ratio of distances L3/D3 that is relevant for a turbojet engine.

Preferably, the through openings of the same blowing line are spaced apart by a first pitch Px along the axis X. The through openings, at the same longitudinal position along the axis X, are spaced apart by a second pitch Py along the axis Y according to the following relationship: Py=Px*α with a being a constant greater than 2, preferably 5, more preferably 10. Such pitches make it possible to emphasize that the through openings are not homogeneously distributed but organized along lines.

Preferably, the inner wall comprising at least one acoustic attenuation structure comprising a plurality of acoustic attenuation ports, the acoustic attenuation ports are distributed on the inner wall outside the blowing lines. Thus, the inner wall provides, on the one hand, through openings for heating and, on the other hand, ports for acoustic attenuation. By virtue of the invention, the number of through openings dedicated to blowing is advantageously reduced, which makes it possible to maximize the number of acoustic attenuation ports and, thus, the acoustic performance. The acoustic performance in the free angular zones is optimal.

Preferably, the honeycomb structure defines, on the one hand, acoustic cells each comprising at least one acoustic attenuation port and, on the other hand, circulation channels forming the blowing lines and comprising the blowing through openings. Thus, the blowing lines are in the form of hot air conduction channels which are pierced by through openings in order to allow the blowing. A blowing line thus makes it possible, even in the absence of through openings, to heat the inner wall by thermal conduction.

Preferably, each through opening has a section area greater than 3 mm² in order to allow for efficient blowing. Still preferably, two adjacent through openings in a blowing line are spaced apart by a defined distance along the axis Y of between 1 and 2.5 times the diameter of a through opening. This prevents the formation of unheated inner wall portions between two consecutive through openings.

Preferably, each acoustic attenuation port has a diameter of less than 0.5 mm to allow for optimal attenuation.

The invention also relates to an air inlet having a de-icing device as disclosed above. The invention also relates to a nacelle having an air inlet as disclosed above. The invention also relates to a turbojet engine having a nacelle as previously disclosed.

The invention also relates to a method for de-icing, by means of a de-icing device as previously disclosed, an air inlet of an aircraft turbojet engine nacelle extending along an axis X in which an air flow circulates from upstream to downstream, the air inlet extending annularly about the axis X and comprising an inner wall facing the axis X and an outer wall which is opposite the inner wall, the method comprising a step of blowing a plurality of elementary flows from the hot air source through the through openings of the blowing lines so as to de-ice the inner wall.

BRIEF DESCRIPTION OF THE DRAWINGS

The invention will be better understood upon reading the following description, which is given solely by way of example, and referring to the appended drawings given as non-limiting examples, in which identical references are given to similar objects and in which.

It should be noted that the figures disclose the invention in detail to implement the invention, said figures of course may of course be used to further define the invention where appropriate.

DETAILED DESCRIPTION

Figure 2:
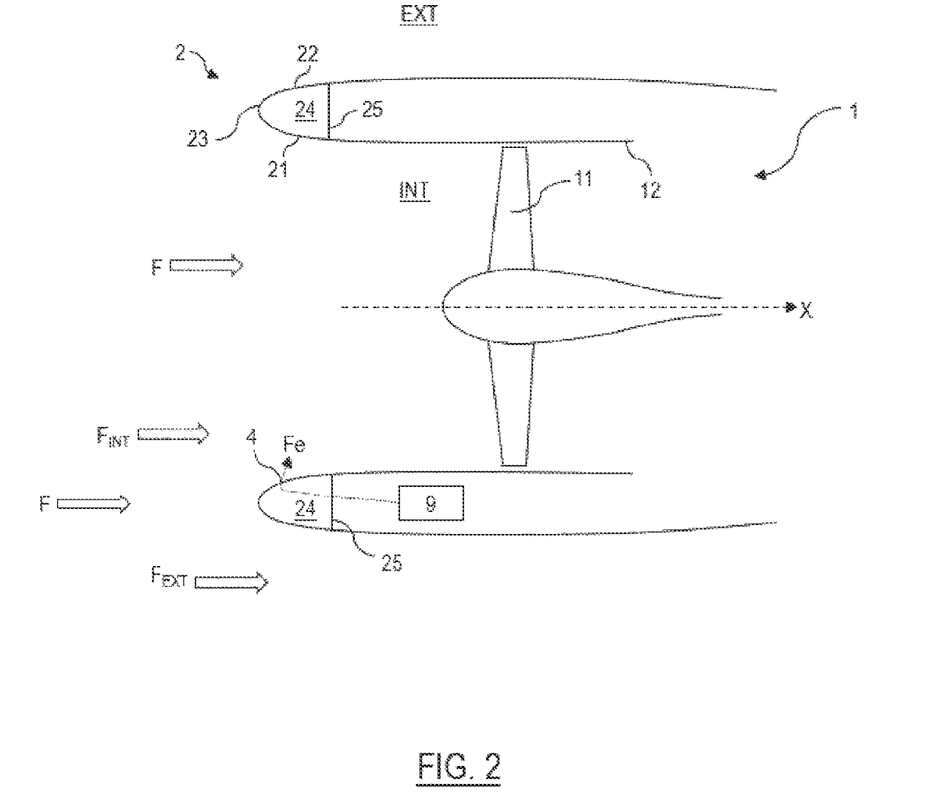
FIG. 2 is a schematic longitudinal cross-sectional representation of an aircraft turbojet engine and an air inlet according to an embodiment of the invention.

With reference to [FIG. 2], there is represented a turbojet engine 1 extending along an axis X and comprising a fan 11 rotatably mounted about the axis X in an outer shroud 12 in order to accelerate an air flow F from upstream to downstream. Hereafter, the terms upstream and downstream are defined in relation to the circulation of the air flow F. At its upstream end the turbojet engine 1 comprises an air inlet 2 comprising an inner wall 21 facing the axis X and an outer wall 22 which is opposite the inner wall 21, the walls 21, 22 are connected by a leading edge 23 known to the skilled person as a "lip". The air inlet 2 further comprises a front internal partition 25 so as to delimit an annular cavity 24 known to the skilled person as a "D-Duct".

Thus, the air inlet 2 allows the incoming air flow F to be separated into an inner air flow $F_{INT}$ guided by the inner wall 21 and an outer air flow $F_{EXT}$ guided by the outer wall 22. Hereafter, the terms inner and outer are defined radially with respect to the axis X of the turbojet engine 1.

In a known manner, during the flight of an aircraft, due to the temperature and pressure conditions, ice is likely to build up at the inner wall 21 and the leading edge 23 of the air inlet 2 and to form blocks of ice which are likely to be ingested by the turbojet engine 1. Such ingestions have to be avoided in order to improve the life of the turbojet engine and to reduce malfunctions.

With reference to [FIG. 2], the air inlet 2 comprises a hot air source 9 mounted in the annular cavity 24. The hot air source 9 is preferably in the form of a hot air supply from the turbojet engine 1, which may be a piccolo tube or a circulation of a circular air flow generated by a nozzle known as a "swirl" nozzle, in order to provide a pressurized hot air flow at a temperature of about 250° C. Such a hot air source 9 is known from prior art and will not be set forth in further detail.

Figure 3:
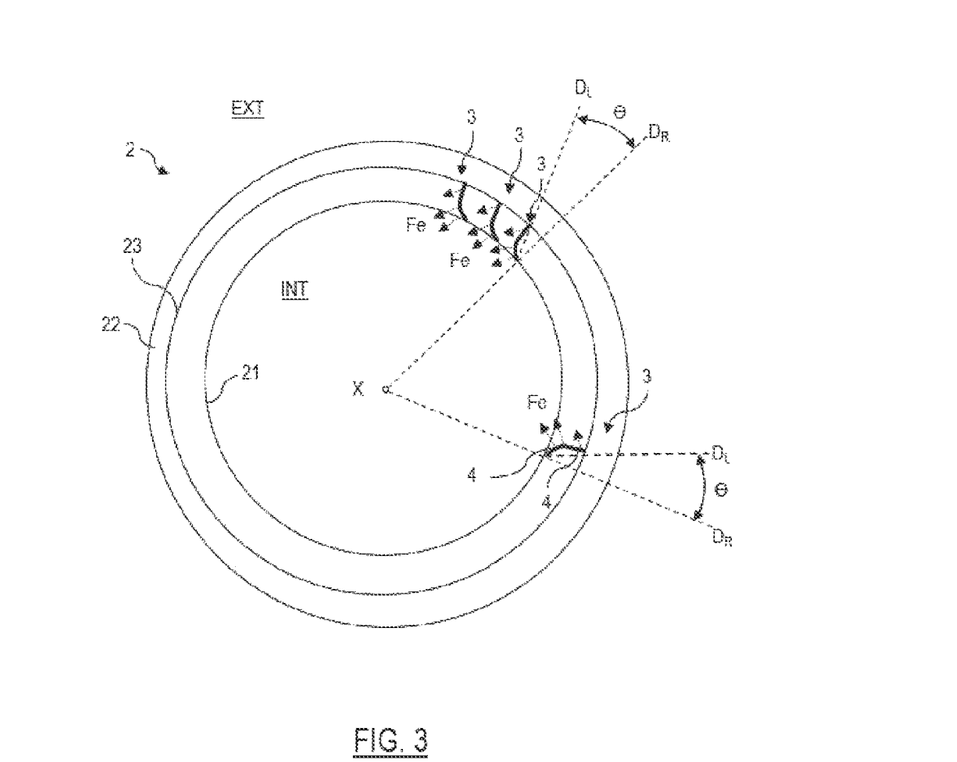
FIG. 3 is a front view of an air inlet according to an embodiment of the invention.
Figure 4:
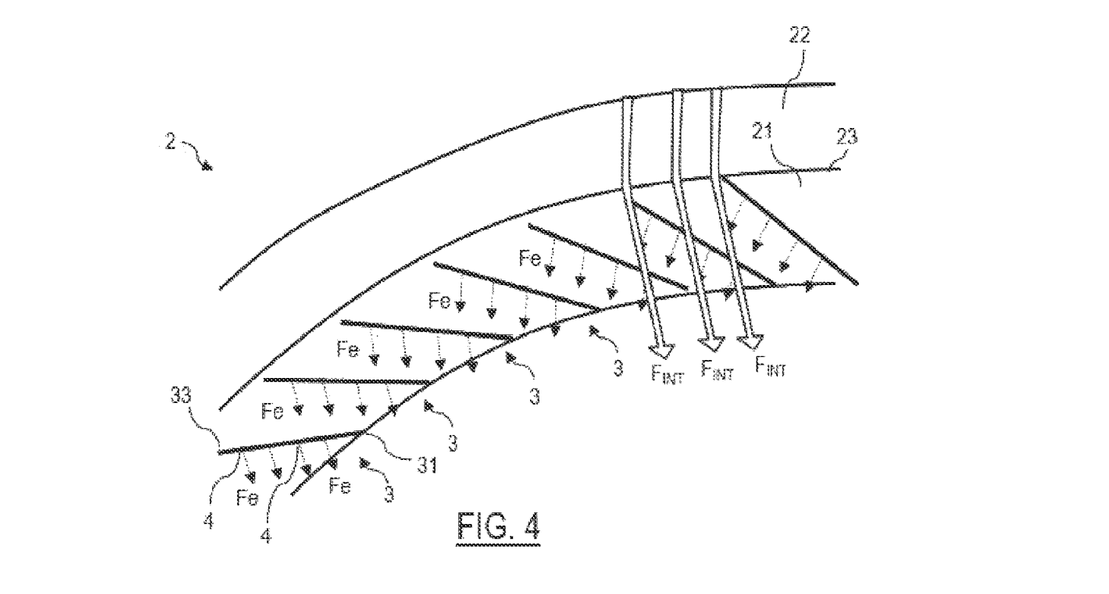
FIG. 4 is a close-up view of the air inlet of [FIG. 3]

In order to allow optimal de-icing, as illustrated in FIGS. 3 to 4, the inner wall 21 comprises a plurality of blowing lines 3, each blowing line 3 comprising a plurality of through openings 4 configured to blow respectively elementary flows Fe from the hot air source 9 in order to de-ice said inner wall 21.

Such elementary flows Fe are advantageous since they make it possible, on the one hand, to blow off ice particles built up directly on the through openings 4 and, on the other hand, to heat the inner wall 21 during the circulation of the elementary flow Fe after its ejection from a through opening 4.

In particular, an elementary flow Fe makes it possible to heat a portion of the inner wall 21 which is located downstream of the through opening 4 from which it is ejected. Indeed, the inner air flow $F_{INT}$ circulating in the turbojet engine 1 drives each elementary flow Fe along an axial direction X downstream, called the stream line. Advantageously, the elementary flow Fe makes it possible to distribute calories to the inner wall 21 as it circulates downstream, which makes it possible to avoid any build-up of ice. The de-icing is thus global even if the through openings 4 are few.

Preferably, the inner wall 21 can comprise, outside the blowing lines 3, acoustic treatment zones. The acoustic treatment zones preferably comprise a noise reduction honeycomb structure 50 as illustrated in [FIG. 6B]. In a known manner, the honeycomb structure 50 thus has an inner skin Pint and an outer skin Pext, spaced apart from each other, so as to form cells, in particular of the Helmholtz type. In a known manner, the inner skin Pint of the honeycomb structure 50 belongs to the inner wall 21 of the air inlet 2.

Preferably, the inner wall 21, that is, the inner skin Pint of the honeycomb structure 50, comprises a plurality of acoustic attenuation ports 5 allowing the entry of acoustic waves into the cells of the honeycomb structure 50 to allow their attenuation. With reference to [FIG. 6A], there is represented an inner wall 21 with through openings 4 for blowing and through ports 5 for acoustic attenuation. Preferably, as shown in [FIG. 6B], the cells are blind, that is, have only a single port 5, to allow for optimal acoustic attenuation. Preferably, the blowing lines 3 are in the form of channels 51 formed in the honeycomb structure 50 that allow hot air to be conducted and elementary flows Fe to be blown through the through openings 4. Thus, de-icing is achieved by blowing but also by thermal conduction.

Figure 6A:
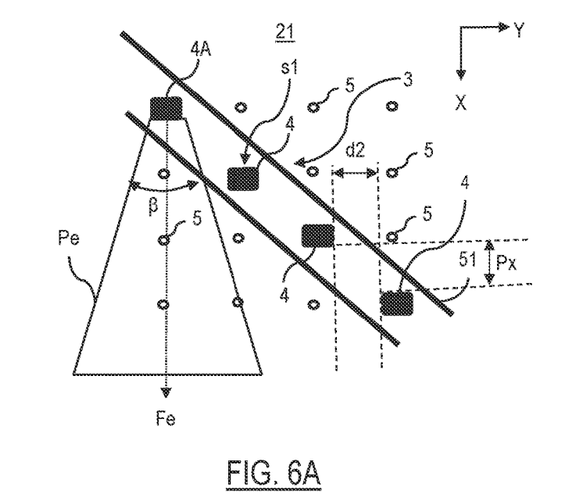
FIG. 6A is a close-up view of the through openings of a blowing line of [FIG. 5] and the acoustic attenuation ports.
Figure 6B:
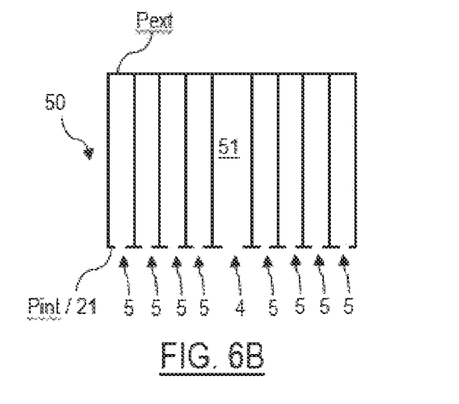
FIG. 6B is a radial cross-sectional view with respect to the axis X of an inner wall.

An acoustic attenuation port 5 thus has a different function from a through opening 4 for blowing. Such a difference in function is also reflected in structural differences. An acoustic attenuation port 5 has a reduced diameter, preferably less than 0.5 mm, compared to a through opening 4 (set forth hereafter).

Preferably, the acoustic attenuation ports 5 are distributed on the inner wall 21 outside the through openings 4 to maximize acoustic treatment performance.

To improve the de-icing performance, it is preferable to increase the size and number of through openings 4. Nevertheless, the larger the size and number of through openings 4, the smaller the number of acoustic attenuation ports 5 and the lower the acoustic treatment performance. In addition, the hot air consumption also increases, which penalizes the performance of the turbojet engine 1. The realization of through openings 4 thus results from a compromise as will be now set forth.

As illustrated schematically in FIGS. 2 to 4, the inner wall 21 of the air inlet 2 is not cylindrical, that is located at the same radial distance from the axis X, but curved for aerodynamic reasons. Also, for the sake of clarity and conciseness, the inner wall 21 will be set forth in a cylindrical projection plane P, that is, located at the same radial distance from the axis X, in order to define the geometric characteristics of the blowing lines 3.

Figure 5:
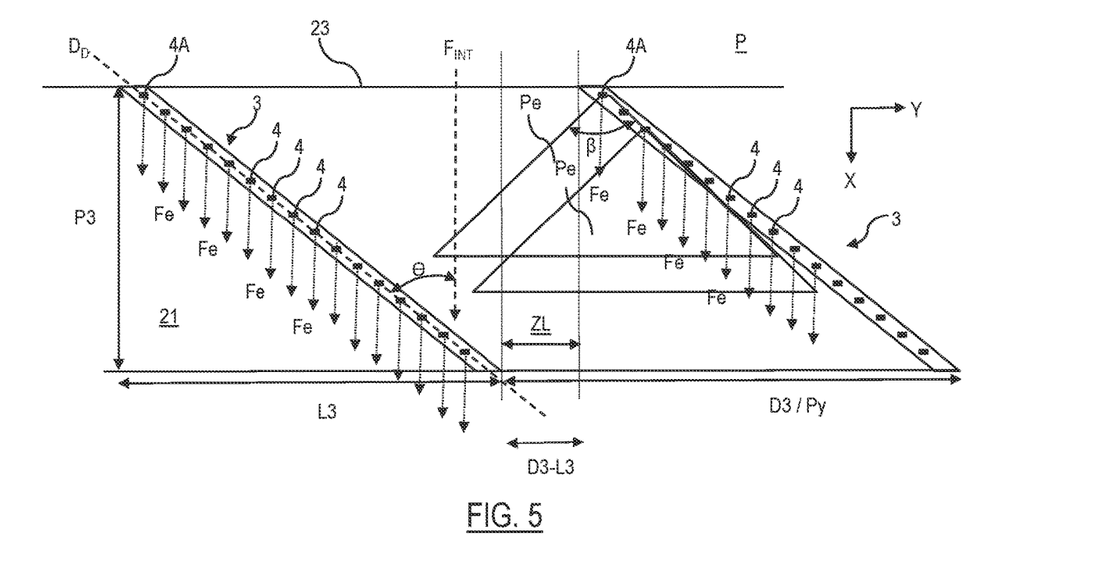
FIG. 5 is a cylindrical projection of the inner wall of the air inlet with two spaced apart blowing lines.

With reference to [FIG. 5], the cylindrical projection plane P is defined in an orthogonal reference frame in which the axis X is the axis of the turbojet engine 1 and the axis Y corresponds to the angular aperture and varies between −180° and +180°.

According to the invention, with reference to [FIG. 5], the blowing lines 3 are parallel to each other in the cylindrical projection plane P. Each blowing line 3 is spaced apart by a tilt angle θ with respect to the axis X in the cylindrical projection plane P, the tilt angle θ being between 20° and 70°. Thus, as illustrated in [FIG. 5], due to the tilt angle θ, an elementary flow Fe from a through opening 4 does not circulate over another through opening 4 during its downstream circulation along the axis X. This advantageously avoids any loss of efficiency due to an overlay related to multiple blowing at the same radial distance from the axis X. The efficiency of heating by the elementary flows Fe is improved since all the portions of the inner wall 21 located downstream of the through openings 4 are heated. As will be set forth hereafter, even if the through openings 4 are distinct from each other, the elementary flows Fe make it possible to heat the inner wall 21 by convection but also by conduction in order to avoid any icing.

The tilt angle θ results from a compromise between the efficiency of de-icing and the efficiency of acoustic attenuation 4. A tilt angle θ, between 35° and 55°, ensures the best compromise.

Hereafter, with reference to [FIG. 5], each blowing line has a depth defined along the axis X denoted as P3 and a length defined along the axis Y denoted as L3. Preferably, the depth P3 corresponds to the total depth of the inner wall 21 of the air inlet 2. The length L3 can be deduced from the depth P3 and the tilt angle θ by the following trigonometric formula: cos θ=P3/L3

Preferably, with reference to [FIG. 5], in order to guarantee a homogeneous de-icing of the inner wall 21, two adjacent blowing lines 3 are spaced apart by the same spacing distance D3 defined along the axis Y.

Preferably, each blowing line 3 has at least 5 through openings 4, preferably at least 10 through openings 4, preferably at least 15 through openings 4. A large number of through openings 4 allows for a precise definition of the ratio of distances L3/D3 which is not relevant for a small number of through openings 4 per line, for example 2 or 3.

A large number of through openings 4 also allows for optimal de-icing of a turbojet engine, in particular, with a fan diameter ranging from 1000 mm to 3000 mm. Preferably, the depth P3 varies between 120 mm and 350 mm.

According to the invention, the ratio of distances L3/D3 is in the range [0.8; 1[, preferably in the range [0.9; 1[, more preferably in the range [0.9; 0.97], so as to allow substantially uniform de-icing of the air inlet while avoiding any overlap of the blowing lines 3 along the direction Y in order to avoid through openings 4 being aligned along the axis X, which would penalize de-icing performance.

As illustrated in [FIG. 5], the blowing lines 3 are angularly spaced so as to avoid any overlap. Thus, the inner wall 21 comprises, between two adjacent blowing lines 3, a free angular zone ZL that has no through openings 4. In other words, each free angular zone ZL does not perform a blowing function and can be dedicated entirely to acoustic attenuation. The acoustic attenuation is thus reinforced. Each free angular zone ZL has a dimension along the axis Y equal to D3−L3 and a dimension along the axis X equal to P3 as shown in FIG. 5.

In [FIG. 5], there are represented blowing lines 3 that are rectilinear, but it goes without saying that they could be curved.

With reference to [FIG. 6A], there is represented a blowing line 3 in a close-up manner. Preferably, each blowing line 3 has a plurality of through openings 4. Preferably, each through opening 4 emits an elementary flow Fe of hot air that circulates downstream due to the inner air flow FINT. In practice, each elementary flow Fe heats, by convection and conduction, an elementary portion Pe of the inner wall downstream of the through opening 4 and which is a function of the distance from the through opening 4.

As illustrated in [FIG. 6A], after being blown through a through opening 4, the elementary flow FE propagates in the form of a flared cone from upstream to downstream. Such a propagation is partly related to the circulation of the stream lines along the axis X and can be optimized by the dimensioning of the through openings 4 (section area, orientation, shape, etc.). Preferably, with reference to [FIG. 5], the propagation cone has a propagation angle β defined according to the following formula: β>2*Arctan(P3/(D3−L3)). Such a propagation angle β ensures de-icing in the free zones ZL which have no through openings 4. Thus, the free zones ZL are de-iced by indirect blowing of the propagation cones of the elementary flows Fe, which makes it possible to limit the energy consumption related to heating.

Preferably, each blowing line 3 comprises at least one through opening 4 located the most upstream, called "primary opening" 4A, configured to blow elementary flows Fe from the hot air source 9 according to a propagation cone whose amplitude is greater than that of at least one other through opening 4 of the blowing line 3, preferably that of each other through opening 4. A primary opening 4A, given its upstream positioning, allows an elementary flow Fe to be propagated in an extensive manner in order to optimally de-ice the free angular zone ZL, that is, over a very extensive elementary portion.

Preferably, each through opening 4 has a section area s1 greater than 3 mm2 so as to optimally de-ice. Preferably, the section area s1 is between 3 mm2 and 6 mm2 so as to ensure a compromise between optimal de-icing and a limitation of hot air consumption.

Preferably, two through openings 4 are spaced apart by the same distance d2, preferably between 1 and 2.5 the diameter of a through opening. A density of through openings 4 along the axis Y of between 25% and 50% ensures a compromise between de-icing performance and acoustic attenuation. Preferably, the density of through openings 4 is substantially constant along the direction Y. By substantially constant, it is meant a local variation of less than 10% with respect to the average density.

With reference to [FIG. 6A], the through openings 4 of the same blowing line 3 are spaced apart by a first pitch Px along the axis X. The through openings 4 at the same longitudinal position along the axis X are spaced apart by a second pitch Py along the axis Y according to the following relationship: Py=Px*α with α being a constant greater than 2, preferably 5, more preferably 10. In this example, the second pitch Py corresponds to the distance D3.

Indeed, as illustrated in [FIG. 5], the through openings 4 are distributed irregularly, which is contrary to prior art which aimed at a regular and homogeneous distribution.

Figure 7:
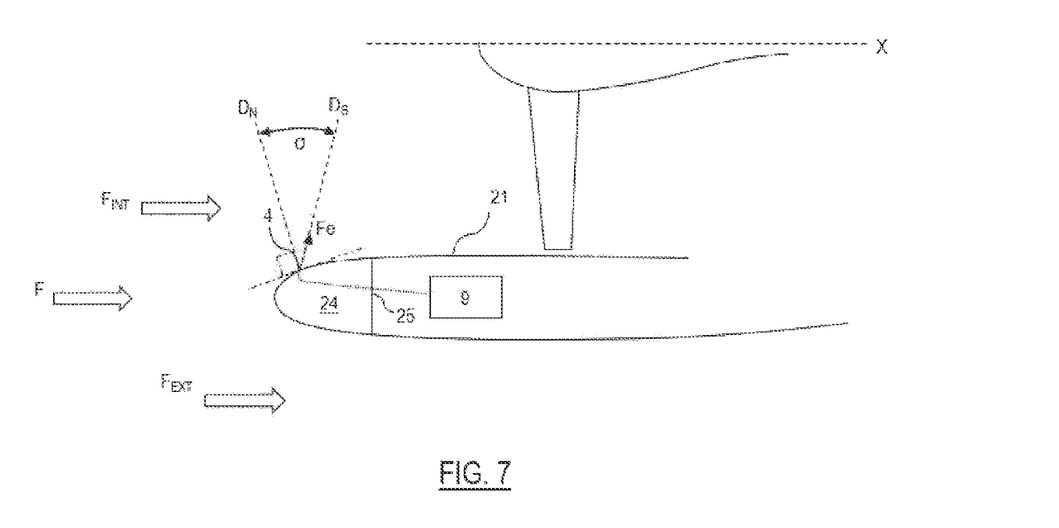
FIG. 7 is an axial cross-sectional view of an air inlet.

Referring now to [FIG. 7], each through opening 4 has an emission axis DS that extends substantially along the axis normal DN to the inner wall 21 in which the through opening 4 is locally formed. Preferably, the emission axis DS is tilted downstream with respect to the normal axis DN by a blowing angle σ. Preferably, better de-icing performance is obtained with a blowing angle σ between 0° and 30°.

In this exemplary embodiment, rectangular through openings 4 have been schematically represented, but it goes without saying that other shapes could be suitable, in particular slots, circular openings or any other calibrated opening.

As previously explained, each through opening 4 has a section area greater than or equal to 3 mm$^2$ so as to provide an effective elementary flow Fe. Such a through opening 4 is advantageously distinguished from an acoustic attenuation port 5, the diameter of which is less than 0.5 mm.

Figure 8:
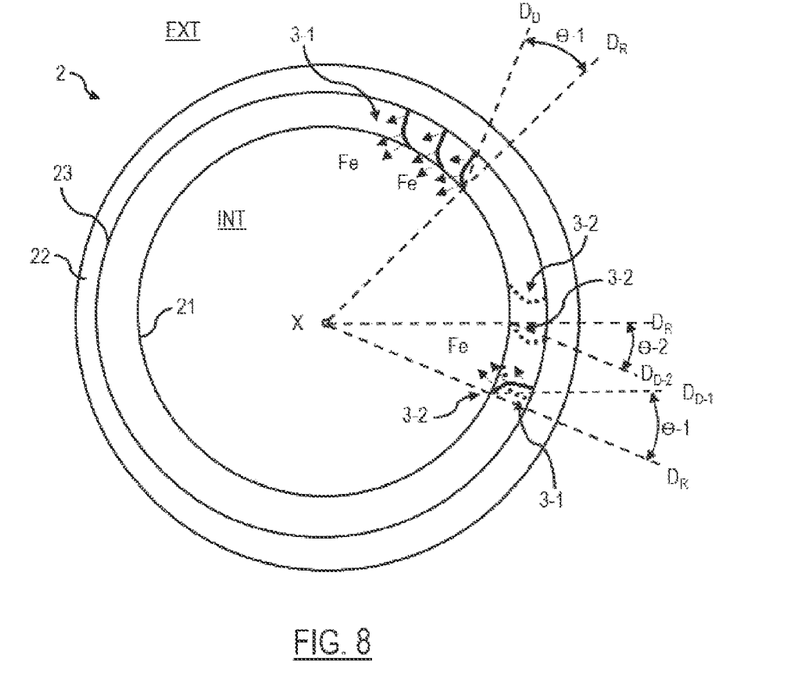
FIG. 8 is a front view of an air inlet according to another embodiment of the invention comprising two sets of blowing lines with different tilt angles.
Figure 9:
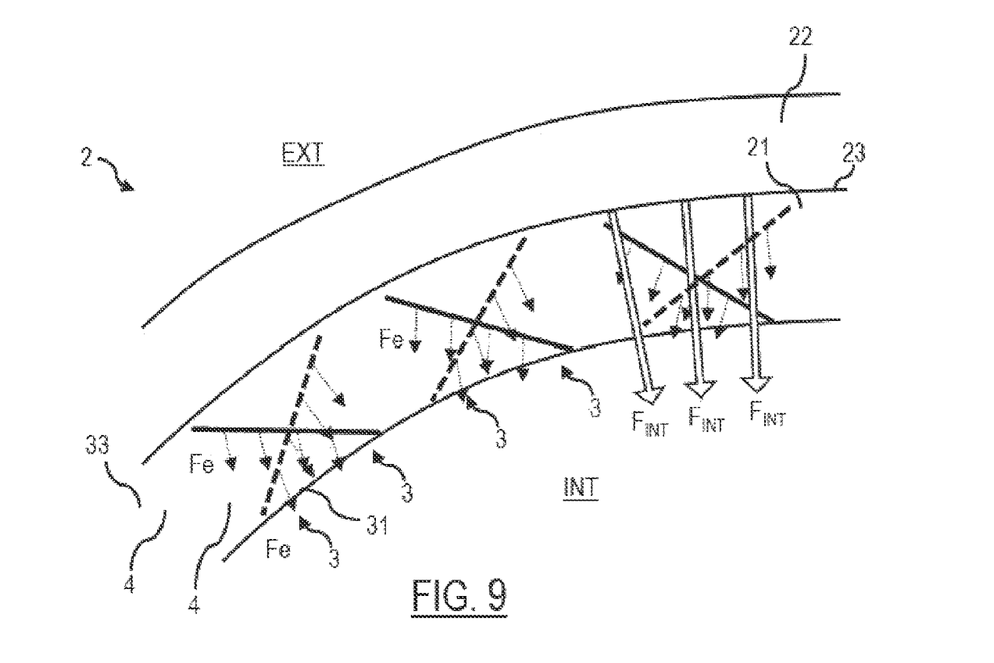
FIG. 9 is a close-up view of the air inlet of [FIG. 8].

In another embodiment of the invention, with reference to FIGS. 8 and 9, the inner wall 21 comprises a first plurality of blowing lines 3 and a second plurality of blowing lines 3, each comprising through openings. Preferably, each first blowing line 3 is spaced apart by a first tilt angle θ-1 with respect to the axis X in the cylindrical projection plane P while each second blowing line 3 is spaced apart by a second tilt angle θ-2 with respect to the axis X in the cylindrical projection plane P.

In this exemplary embodiment, the first tilt angle θ-1 and the second tilt angle θ-2 have different signs so as to provide different de-icing. The use of two pluralities of blowing lines 3 allows a synergistic de-icing between the elementary flows Fe from the different pluralities of blowing lines 3. It goes without saying that the inner wall 21 could comprise more than two pluralities of blowing lines 3.

In operation, the hot air source 9 supplies the blowing lines 3 which make it possible to heat the inner wall 21 by conduction when the hot air circulates in the conduction channels 51 of the honeycomb structure 50 which the blowing lines 3 have the shape of. In addition, the hot air source 9 supplies the through openings 4 of the blowing lines 3 which allow for conductive heating. As these are distributed around the periphery of the inner wall 21, de-icing is carried out homogeneously. The tilt of the blowing lines 3 and the judicious spacing of the blowing lines 3 from each other prevents numerous through openings 4 being aligned along the axis X, which would penalize the de-icing performance. Thus, each through opening 4 emits an elementary flow Fe of hot air which is guided along the axis X by the inner air flow $F_{INT}$ of the turbojet engine 1 in order to de-ice, by convection and conduction, a portion of the inner wall located downstream of the through opening 4.

Contrary to prior art which taught uniform heating, only a few local blowing lines 3 allow global de-icing. The spacing of the blowing lines 3 is advantageous since it allows any built up ice to be rendered liquid without allowing it to revert to ice as it flows downstream. Such a distance ratio reduces the consumption of hot air for de-icing.

The invention claimed is:

1. An air inlet of an aircraft turbojet engine nacelle comprising:
   a de-icing device extending along an axis X in which an air flow circulates from upstream to downstream;
   the air inlet extending annularly about the axis X and comprising an inner wall facing the axis X and an outer wall opposing the inner wall;
   the inner and outer walls being connected by a leading edge and a front internal partition to define an annular cavity;
   the de-icing device comprising at least one hot air source in the annular cavity;
   the inner wall comprises a plurality of blowing lines, each blowing line comprising a plurality of through openings configured to blow elementary flows from the at least one hot air source to de-ice said inner wall;
   the plurality of blowing lines being parallel to each other in a cylindrical projection plane defined with respect to the axis X of the aircraft turbojet engine nacelle and to an axis Y defining an angular position with respect to the axis X;
   each blowing line having a depth P3 defined along the axis X and a length L3 defined along the axis Y in the cylindrical projection plane; and
   wherein two adjacent blowing lines are spaced apart by a distance D3 along the axis Y, with each position along the axis Y comprising at most one through opening and a ratio of L3/D3 being in a range of [0.8; 1].

2. The air inlet according to claim 1, wherein each blowing line is spaced apart by a tilt angle with respect to the axis X in the cylindrical projection plane, the tilt angle is between 20° and 70°.

3. The air inlet according to claim 1, wherein the inner wall comprises at least one free angular zone, formed between two adjacent blowing lines, which has no through openings.

4. The air inlet according to claim 1, wherein each blowing line comprises at least one through opening located at a most upstream point, called "a primary opening", configured to blow the elementary flows from the at least one hot air source according to a propagation cone having an amplitude that is greater than at least one other through opening of the blowing line.

5. The air inlet according to claim 1, wherein each blowing line has at least 5 through openings.

6. The air inlet according to claim 1, wherein, the plurality of through openings of a specific blowing line are spaced apart by a first pitch Px along the axis X and the plurality of through openings, along the axis X longitudinal positions, are spaced apart by a second pitch Py along the axis Y according to a relationship, wherein relationship is defined by the formula: $Py=Px*\alpha$ with $\alpha$ being a constant greater than 2.

7. The air inlet according to claim 1, wherein the inner wall comprises at least one acoustic attenuation structure comprising a plurality of acoustic attenuation ports, the plurality of acoustic attenuation ports are distributed on the inner wall outside the plurality of blowing lines.

8. The air inlet according to claim 7, wherein the at least one acoustic attenuation structure is a honeycomb structure that defines acoustic cells, each comprising at least one acoustic attenuation port, and circulation channels, forming the plurality of blowing lines comprising the plurality of through openings.

9. The air inlet according to claim 7, wherein each acoustic attenuation port has a diameter of less than 0.5_mm.

10. The air inlet according to claim 1, wherein each through opening has a section area greater than 3 $mm^2$.

11. A method for de-icing the air inlet of an aircraft turbojet engine nacelle of claim 1, the method comprising a step of blowing a plurality of elementary flows from the hot air source through the plurality of through openings of the plurality of blowing lines to de-ice the inner wall.

* * * * *